E. STAPLES.
DOUGH KNEADER.
No. 185,978.  Patented Jan. 2. 1877.
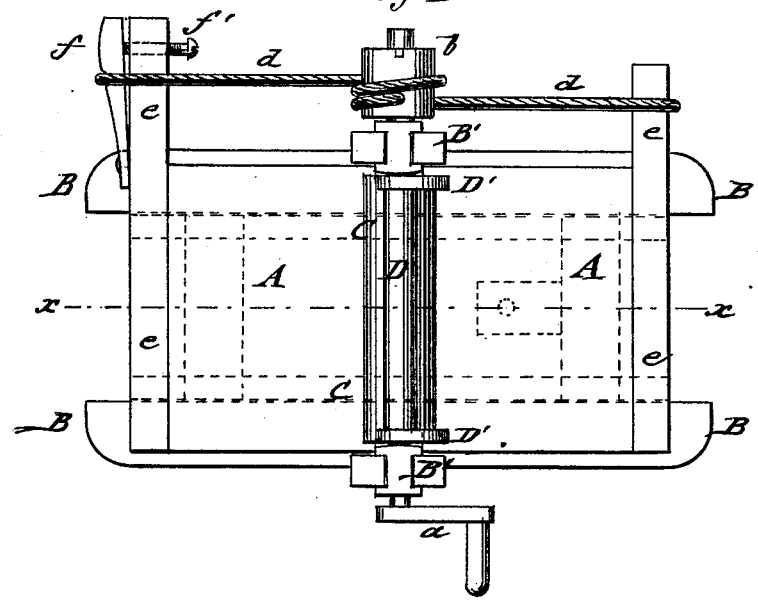
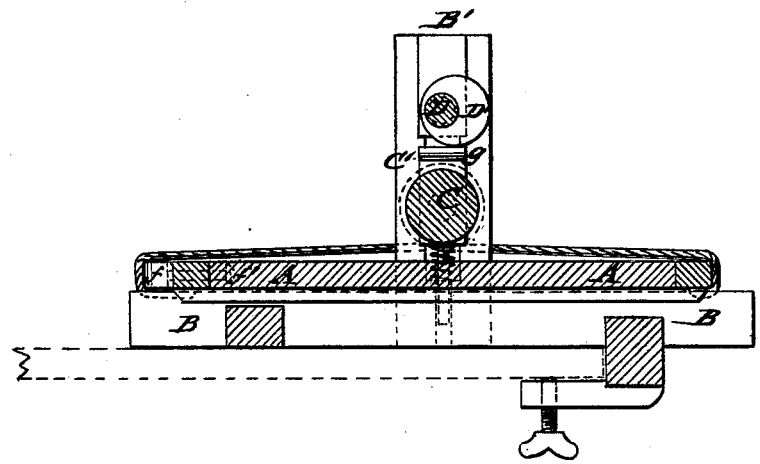
WITNESSES:
E. Wolff
J. H. Scarborough
INVENTOR:
E. Staples,
BY 
ATTORNEYS

UNITED STATES PATENT OFFICE.

EZRA STAPLES, OF ROCHESTER, NEW HAMPSHIRE.

IMPROVEMENT IN DOUGH-KNEADERS.

Specification forming part of Letters Patent No. 185,978, dated January 2, 1877; application filed November 25, 1876.

*To all whom it may concern:*

Be it known that I, EZRA STAPLES, of Rochester, Strafford county, New Hampshire, have invented a new and Improved Dough-Kneader, of which the following is a specification:

Figure 1 represents a top view, and Fig. 2 a vertical longitudinal section on line $x\ x$, of my improved dough-kneader.

Similar letters of reference indicate corresponding parts.

The object of my invention is to furnish for family and other use an improved dough-kneader, by which the dough for bread, &c., may be kneaded in easier, more rapid, and superior manner than by the common mode of kneading by hand; and the invention consists of a reciprocating molding-board and spring-acted roller adjusted by an eccentric-cam device.

In the drawing, A represents the molding-board, that is reciprocated on a supporting guide-frame, B, which is firmly clamped to a table or other support. The kneading-roller C turns in sliding and spring-acted bearings $c'$ of upright guide-standards B' of frame B, and is revolved to bear on the dough by a hand-crank, $a$. The shaft of the roller C is provided with a winding roller or drum, $b$, at the side opposite to the crank, which drum is connected by cords $d$, attached thereto, and wound in opposite directions thereon, with lateral end strips $e$ secured to the molding-board.

By turning the roller in one direction, and then in opposite direction, the molding-board is carried forward and back simultaneously with the turning of the roller.

The tension of the cords $d$ is regulated by a movable piece, $f$, at the outer end of one of the end strips $e$ and by a set-screw, $f'$.

If desired, two kneading-rollers may be used, and in place of the cords suitable belts, gearing, or equivalent mechanism for reciprocating the board substituted.

The top roller D, with eccentric cams D', serves to regulate the pressure of the kneading-roller on the dough, by bearing on projecting seats $g$ of the sliding roller-bearings.

The dough is by this machine quickly kneaded, and thoroughly, without fatigue, so as to be of special advantage for family use.

Having thus described my invention, I claim as new and desire to secure by Letters Patent—

The combination of the revolving pressure-roller and reciprocating molding-board, operated jointly therewith, with a pressure-regulating cam device, substantially as set forth.

EZRA STAPLES.

Witnesses:
CHARLES S. ELA,
EDWARD C. NEAL.